H. G. SOLOMON.
SMELTING OR REFINING OF METALS AND THE LIKE IN CRUCIBLES.
APPLICATION FILED APR. 9, 1912.

1,081,164.

Patented Dec. 9, 1913.

6 SHEETS—SHEET 1.

Witnesses. Henry George Solomon, Inventor.

Attorney.

H. G. SOLOMON.
SMELTING OR REFINING OF METALS AND THE LIKE IN CRUCIBLES.
APPLICATION FILED APR. 9, 1912.

1,081,164.

Patented Dec. 9, 1913.
6 SHEETS—SHEET 2.

Witnesses.
Sidney Brooks
J. P. Davis

Inventor.
Henry George Solomon
By Munn & Co
Attorney.

Inventor:
Henry George Solomon

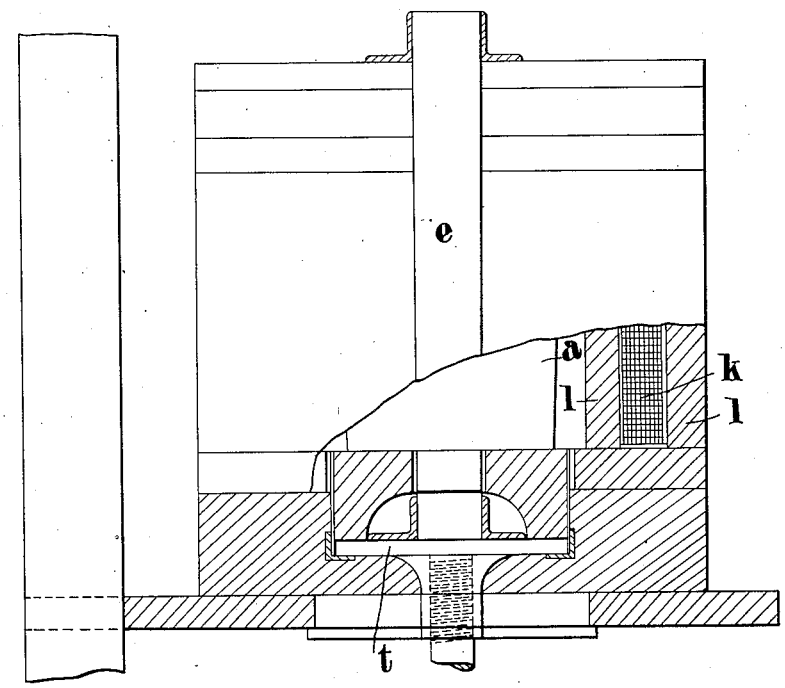
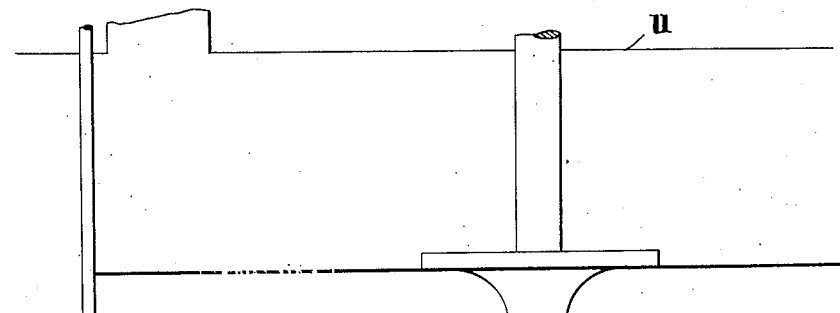
Fig. 5.
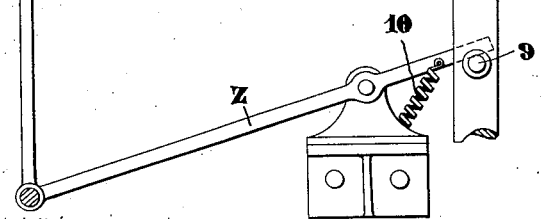

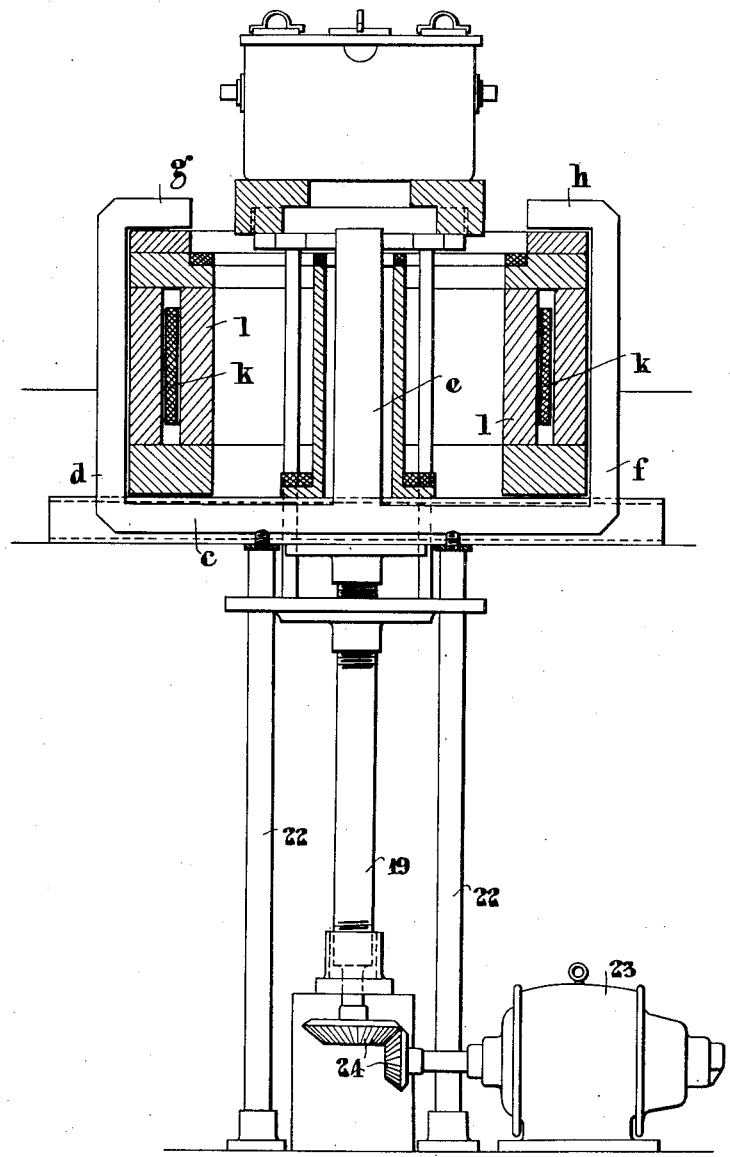

UNITED STATES PATENT OFFICE.

HENRY G. SOLOMON, OF LONDON, ENGLAND.

SMELTING OR REFINING OF METALS AND THE LIKE IN CRUCIBLES.

1,081,164.  Specification of Letters Patent.  Patented Dec. 9, 1913.

Application filed April 9, 1912. Serial No. 689,478.

*To all whom it may concern:*

Be it known that I, HENRY GEORGE SOLOMON, a subject of the King of Great Britain and Ireland, and residing at 4 Elgin Court, Elgin avenue, Maida Vale, in the county of London, England, have invented new and useful Improvements in or Relating to the Smelting or Refining of Metals and the like in Crucibles, of which the following is a specification.

This invention relates to induction furnaces applicable for crucible smelting and refining purposes.

The object of the present invention is to provide an improved form of induction furnace which shall be particularly, though not solely, applicable to the crucible process for making steel and steel alloys.

The invention consists principally in an induction furnace comprising a transformer having one of its limbs adapted to be surrounded by an annular crucible, a casing surrounding either the crucible or the transformer or one casing for each, a movable device or devices adapted to close said casing or casings, and a bridge piece for the transformer connected to and movable with said movable device or devices.

The invention also consists in the various details hereinafter more particularly referred to.

Figure 1:
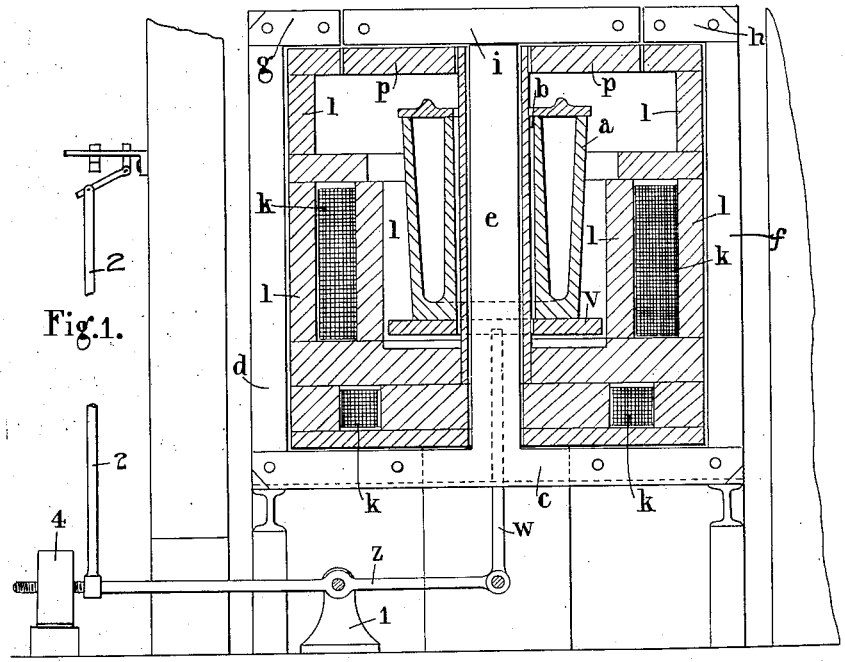
Figure 2:
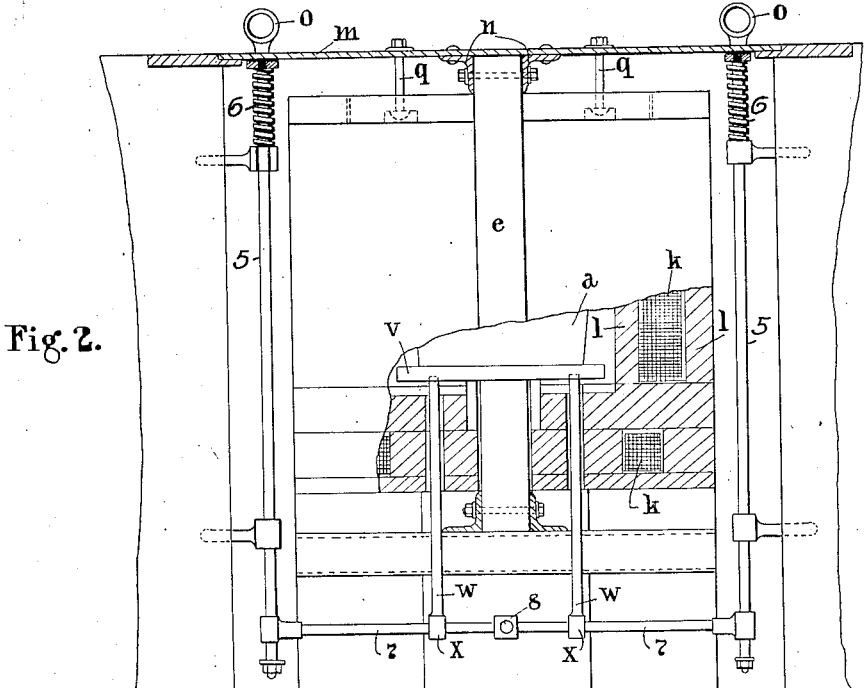
Figure 6:
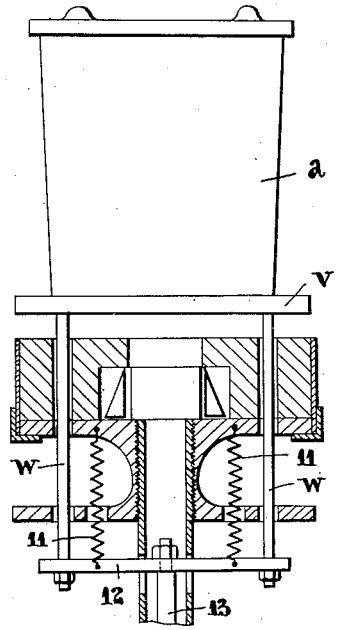
Figure 6:
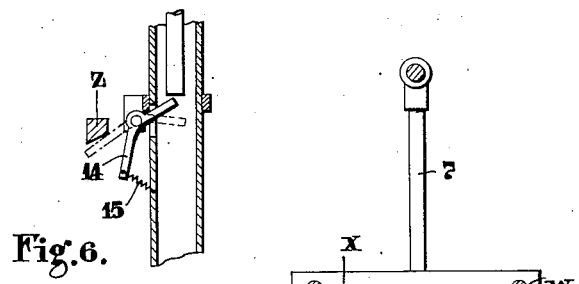
Figure 3:
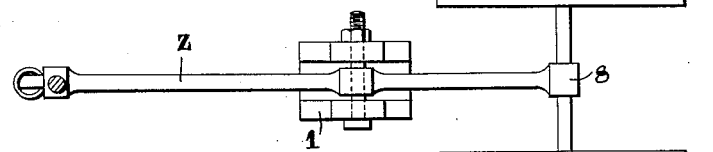
Figure 4:
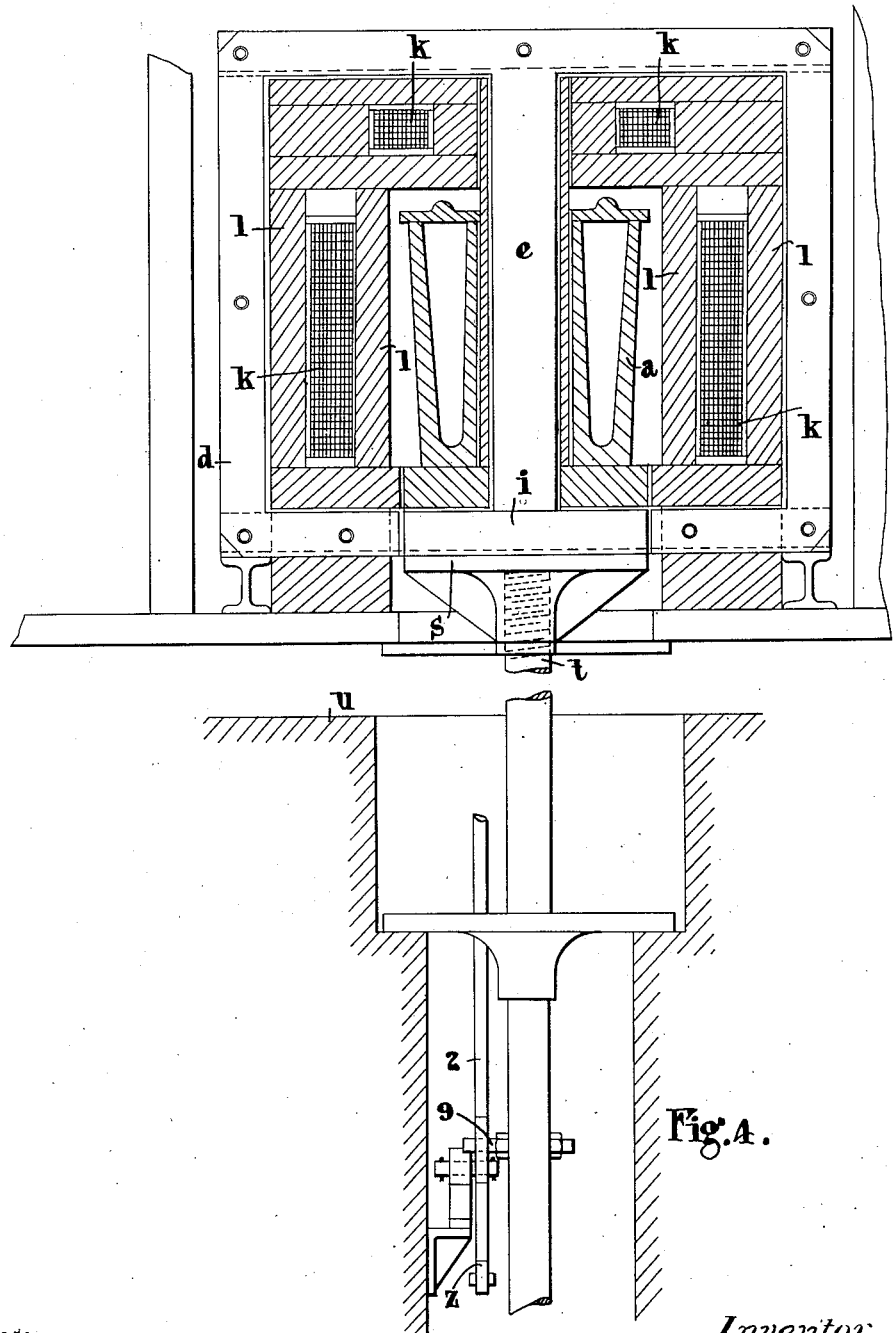
Figure 7:
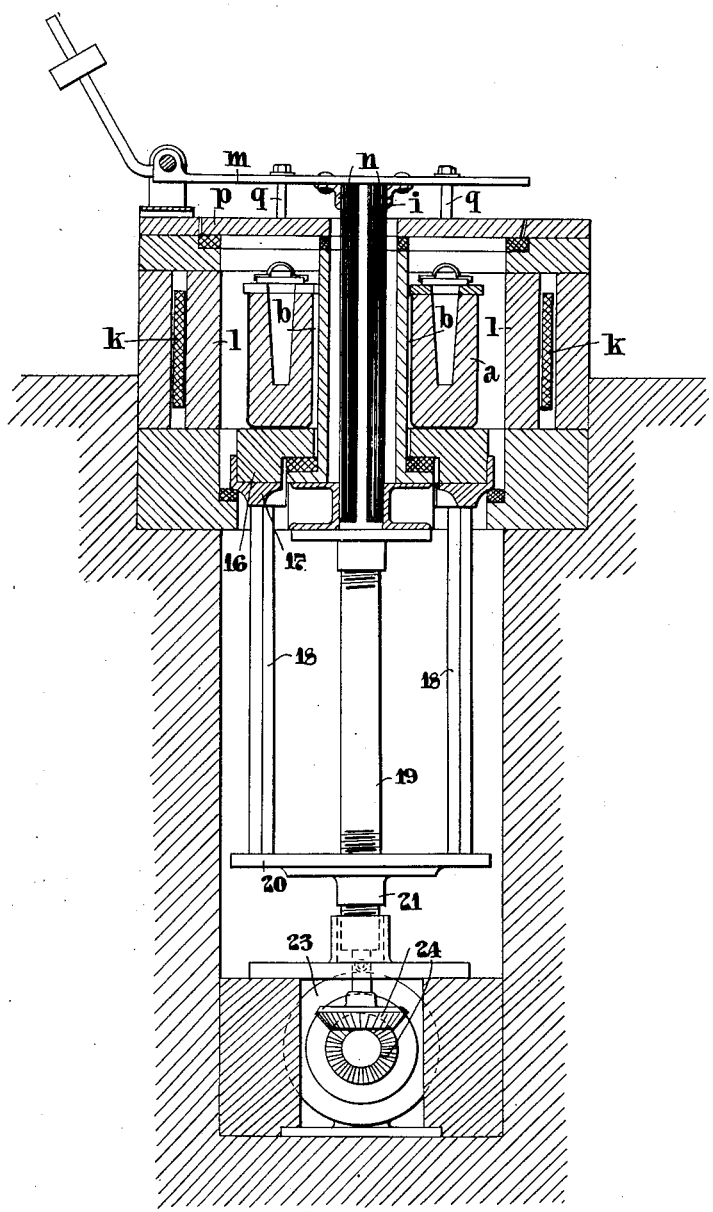

The accompanying drawings illustrate several modes of carrying out the invention. Figure 1 is a sectional elevation showing one convenient construction of furnace, portions of the figure being broken away. Fig. 2 is a side elevation of Fig. 1 partly in section. Fig. 3 is a plan of a detail. Figs. 4 and 5 are also similar views showing a further modification. Fig. 6 is a fragmentary view showing a modification of a detail. Figs. 7 and 8 are views illustrating a modified form of construction according to the invention.

In carrying my invention into effect in one convenient manner I employ an annular crucible or melting pot $a$ of convenient size and having a central passage $b$ therethrough, the crucible being adapted to be combined with a transformer which may be for either single phase or multi-phase alternating current. The transformer may be formed with a horizontal yoke $c$ having three vertical limbs $d$, $e$ and $f$, the central limb $e$ passing through the central passage in the crucible and the side limbs $d$ and $f$ being, if desired, bent around slightly into the horizontal position at the top as shown at $g$ and $h$. A T piece, if the central limb is slightly lower than the side limbs of the transformer, or a laminated bar $i$ or series of strips, if the limbs are all at one level as shown, is employed to bridge the limbs so that the transformer is a closed circuit transformer. The primary coils $k$ may be arranged in any desired relation to the transformer and to the crucible or melting pot $a$ and the latter may be separated from the coils and from the transformer by means of partitions $l$ of any suitable heat-resisting material if desired.

For convenience of handling, the bridge piece $i$ which completes the transformer circuit and which is loose for the purpose of allowing the crucible to be inserted or withdrawn, for instance, when required for pouring, is secured to the cover $m$ of an outer chamber surrounding the transformer by means of angle irons $n$ or in any other suitable manner, the cover being adapted to be either hinged or to be lifted completely off, for example, by means of the eyelets $o$ so as to remove the aforesaid bridge-piece simultaneously with the cover. I also prefer to provide loose pieces $p$ of suitable heat-resisting material which are also to be raised with the cover and which may be secured thereto by bolts $q$ as clearly shown in Fig. 2.

Although I have described my invention as applied to a process carried out in a chamber at or below the level of the floor it is equally applicable to cases when the process is to be carried out above the floor level, a convenient form of furnace for such a purpose being illustrated in Figs. 4 and 5. In this case the combination of crucible and transformer may in part be supported upon a platform $s$ carried by or formed in one with a hydraulic piston $t$ or other equivalent device so that when the smelting process is complete or for any other purpose the crucible may be lowered from the chamber to the floor level $u$ and may then be readily withdrawn or the crucible may be conveniently mounted upon trunnions so that it may be poured direct. For such a construction it is preferred to place the larger portion of the transformer above and around the crucible or melting pot, the circuit being completed by the horizontal yoke or bridge-piece $i$ situated upon the platform $s$ which when in the highest position, as shown in the figures, closes the crucible chamber, the crucible a and the primary coils k being situated above the yoke i and the coils k being carried fixedly in the chamber. Further, I may provide any suitable means operated pneumatically, mechanically or electrically to automatically cut off the current from the coils at all times except when the crucible and cover are in position in the furnace. One convenient mechanical mode of effecting such an object is shown in the drawings where the platform v supporting the crucible a is carried upon rods or other supporting members w in turn connected to a pair of supports x pivotally carried at one end of a double-ended lever z pivotally mounted upon a convenient bracket or other support 1. The end of the lever z remote from that which supports the platforms v is connected by a bar 2, cord, chain or other similar connecting means to the switch controlling the electrical supply, the switch being normally held in its "off" position by a spring 3 or other equivalent means, such as the weight 4, illustrated in Fig. 1. The arrangement is such that when the crucible with its metal contents is placed upon the platform v that end of the lever z carrying the supports x has a tendency to be depressed against the action of the spring 3 or the weight 4 but the latter are so adjusted that the switch is not closed until both the crucible with its charge of metal and the cover m of the furnace are in position. This is effected by means of the rods or links 5 controlled by springs 6, and having their ends respectively bearing against the cover m and slidably connected to a rod or bar 7 carried by the end 8 of the lever z, the arrangement being such that when both the cover and the crucible with its charge of metal are in position in the furnace their combined weights acting against the controlling springs or weights are just sufficient to depress the levers z to the amount required for closing the switch but under no other conditions will the switch be closed.

For that form of furnace which is employed in a gallery above the floor level and illustrated in Figs. 4 and 5 slightly modified means may be employed for operating the controlling switch. Thus, in Figs. 4 and 5 the rod 2 or the like is connected to one end of the double-ended lever z the other end of which is adapted to be moved by a tappet 9 upon the piston or the like t against the action of its controlling spring 10 so that the switch is operated when the piston is in its uppermost position and the melting chamber closed. When it is desired to make the closing of the switching means dependent upon the weight of the crucible and its contents this may be conveniently effected in one mode by the modified device shown in Fig. 6 where the hydraulic piston or the like is made hollow and the crucible a is supported as before upon a platform v carried by rods w normally held in their upper position by means of tension springs 11 secured respectively to the platform of the hydraulic piston and to a bar or bars 12 connecting the lower ends of the rods w. The bar 12 has secured thereto a rod 13 which is adapted to pass down the hollow piston at the lower end of which is secured a form of bell crank lever 14, one end of which projects within the hollow piston while the other end is controlled by a spring 15. The arrangement is such that when the crucible with its metal contents is not in position on its platform the parts assume the position shown in full lines in Fig. 6 when it will be seen that the end of the bell crank lever 14 during the upward motion of the piston would clear the end of the lever z so that the switch would not be operated. When, however, the crucible with its contents is in position the rod 13 is depressed against the action of the springs 11 so that the bell crank lever assumes the position shown by the dotted lines in Fig. 6 and will then act as a tappet which moves the lever z during the upward movement of the piston thus operating to close the switch.

Figs. 7 and 8 are two views illustrating a modified form of construction in accordance with my invention, those parts which are similar to the corresponding parts hereinbefore described being illustrated by similar reference letters so that it will be unnecessary to describe them again in detail. The modification shows a form of furnace which may be conveniently located at or near the floor level, means being provided for automatically raising the crucible up from below for the purpose of removal for pouring or for any other reason. Any suitable arrangement may be adopted for effecting this automatic raising of the crucible such as hydraulic or mechanically operated means; thus in one convenient form the crucible may be adapted to rest upon a block 16 of refractory material which is held upon an annular or sector-shaped platform 17 supported by a suitable bracket or by one or more standards or supports 18 adapted to surround a fixed central pillar 19 and the lower ends of the standards 18 are carried by a platform 20 adapted to be raised from below in any suitable manner as, for example, the central spindle 19 carried in suitable bearings may be screwed or threaded and caused to rotate in any suitable manner so as to cause a nut 21 and with it the platform 20 to rise or fall as desired, the platform being held from any tendency to rotate by suitably fixed guides 22. If desired, an alternative arrangement may be adopted in which one or more nuts held from longitudinal movement is or are caused to rotate upon one or more of the standards carrying the crucible platform, said standards being suitably screwed or threaded for engagements with the nuts. The necessary rotation of the threaded spindle 19 may be effected by means of an electric motor 23 and gearing 24 as shown in the drawings or by any other suitable form of prime mover or by gearing hand-operated from above or from the floor level.

Having now described my invention what I claim as new and desire to secure by Letters Patent is:—

1. An induction furnace comprising a transformer the secondary of which is formed by an annular crucible, a casing surrounding the transformer, a movable device adapted to close said casing and a bridge-piece for the transformer connected to and movable with said movable device.

2. An induction furnace comprising a transformer the secondary of which is formed by an annular crucible, a casing surrounding the crucible, a movable device for closing said casing, a bridge-piece for the transformer connected to and movable with said movable device, and means for automatically withdrawing the crucible from the crucible chamber when required.

3. An induction furnace comprising a transformer the secondary of which is formed by an annular crucible, a casing surrounding the crucible and means for automatically closing the electric supply circuit of a transformer only when the crucible with its charge is in position.

4. An induction furnace comprising a transformer the secondary of which is formed by an annular crucible, a casing surrounding the crucible, a movable device for closing said casing, a bridge-piece for the transformer connected to and movable with said movable device and means for closing the electric supply circuit of the transformer only when the crucible is in position in the crucible chamber.

5. An induction furnace comprising a transformer the secondary of which is formed by an annular crucible, a casing surrounding said crucible, a movable device adapted to close said casing, a bridge-piece for the transformer, connected to and movable with said movable device and means for automatically raising the crucible out of the crucible chamber when required.

6. An induction furnace comprising a transformer, an annular crucible surrounding one limb of the transformer, a casing surrounding said crucible, a movable device adapted to close said casing, a bridge-piece for the transformer connected to and movable with said movable device, a platform adapted to support the crucible, a nut adapted to support said platform, a screwed spindle engaging with said nut and means for rotating said spindle.

7. An induction furnace comprising a transformer the secondary of which is formed by an annular crucible, a casing surrounding said crucible, means for automatically withdrawing the crucible from the crucible casing when required, and means for closing the electric supply circuit of the transformer only when the crucible is in position in the crucible chamber.

8. An induction furnace comprising a transformer the secondary of which is formed by an annular crucible, a casing surrounding said crucible, a movable device adapted to close said casing, a bridge-piece in the transformer in connection with and movable with said movable device, means for automatically withdrawing the crucible from the crucible chamber and means for closing the electric supply circuit of the transformer only when the crucible with its charge is in position in the crucible chamber.

9. An induction furnace comprising a transformer the secondary of which is formed by an annular crucible, a casing surrounding said crucible, a platform adapted to support said crucible, a movable device adapted to close the crucible casing, resilient means for supporting the platform upon the movable device and means for closing the electric supply circuit for the transformer only when the crucible and its charge are in position in the crucible chamber.

In testimony whereof I affix my signature in the presence of two witnesses.

H. G. SOLOMON.

Witnesses:
BERTRAM H. MATTHEWS,
WALTER J. SKERTEN.